Patented Mar. 2, 1948

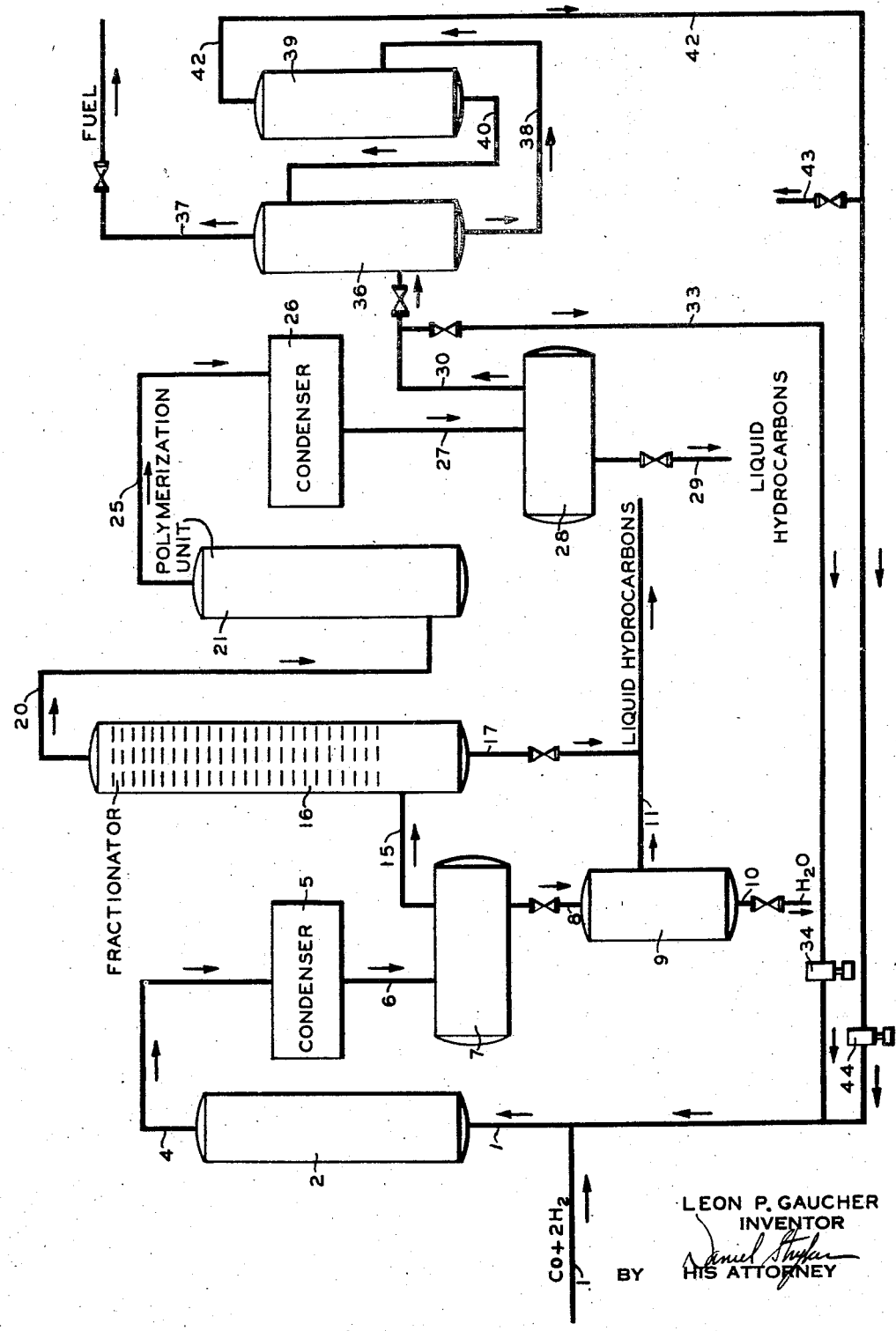

2,436,962

UNITED STATES PATENT OFFICE 2,436,962

CATALYTIC PROCESS FOR THE SYNTHESIS OF HYDROCARBONS AND THE LIKE FROM HYDROGEN AND THE OXIDES OF CARBON

Leon P. Gaucher, Mount Vernon, N. Y., assignor to The Texas Company, New York, N. Y., a corporation of Delaware Application December 6, 1945, Serial No. 633,248

5 Claims. (Cl. 260—449.6)

1

This invention relates to the catalytic conversion of carbon monoxide and hydrogen into hydrocarbons, oxygenated hydrocarbons and the like.

The invention contemplates catalytically converting a mixture of carbon monoxide and hydrogen into hydrocarbons, oxygenated hydrocarbons and the like in a reaction zone under suitable conditions of temperature and pressure. The effluent from the reaction zone which comprises normally gaseous and normally liquid hydrocarbons, steam, carbon dioxide, unreacted carbon monoxide and hydrogen and some nitrogen is separated into normally gaseous and normally liquid components through conventional means. The normally gaseous components which comprise normally gaseous paraffinic and olefinic hydrocarbons, carbon dioxide, nitrogen, unreacted carbon monoxide and hydrogen are passed to a polymerization unit wherein their olefin content is polymerized by contact with a suitable catalyst under the proper conditions. The liquid hydrocarbons which are formed by polymerization of the olefins are separated from the residual gases and may be combined with the previously mentioned liquid hydrocarbons for further treatment. The residual gases, comprising normally gaseous hydrocarbons, mostly paraffinic, carbon dioxide, carbon monoxide and hydrogen, are split into two portions: the major portion is recycled to the reaction zone wherein the catalytic conversion takes place; carbon dioxide is stripped from the remaining minor stream and is then recycled to the reaction zone.

The total feed to the reactor contains fresh feed and recycle feed in such proportions that the recycle stream constitutes about 50 to 80% of the total reactor feed. Thus the reactor feed contains about 1 to 4 volumes of recycle gas per volume of fresh feed.

The total recycle is made up of two streams. One stream contains at least 95% carbon dioxide. The other recycle stream comprises carbon dioxide, normally gaseous paraffinic hydrocarbons, unreacted carbon monoxide and hydrogen. The latter recycle stream is of greater volume than the former.

By conducting a recycle operation in this fashion, it is possible to maintain the carbon dioxide content of the total reactor feed in the range of about 15 to 30%. There is a considerable quantity of carbon dioxide present in the larger of the two recycle streams and the carbon dioxide content of the reactor feed may be maintained at the desired value by regulating the amount of pure carbon dioxide recycle.

There are numerous advantages which accrue from conducting the catalytic conversion of carbon monoxide and hydrogen into desired products utilizing the mode of recycle as disclosed in this invention.

First, it is possible to realize the greatest ultimate yields of products with a minimum cost of recycling. The total unconverted carbon monoxide and hydrogen are returned to the reactor with a minimum amount of other gases since the normally gaseous olefinic hydrocarbons are removed from the recycle stream by polymerization.

Secondly, the polymerization of the olefins present in the gaseous effluent from the catalytic conversion assures the highest possible yield of liquid hydrocarbons.

Thirdly, since a major portion of the gases from the polymerization unit are recycled directly to the reaction zone, it is not necessary to employ a large and costly carbon dioxide absorbing system to strip carbon dioxide from these gases.

Fourthly, the presence of a large concentration of diluents such as carbon dioxide, hydrogen, carbon monoxide and gaseous paraffins, is advantageous in the polymerization process.

Fifthly, a cool recycle is provided which aids in the maintenance of the necessary close temperature control in the conversion reaction zone.

In order that the invention may be more aptly described and fully understood, reference will now be made to the accompanying drawing in which the method of flow as outlined in this invention is diagrammatically presented.

Synthesis gas, comprising carbon monoxide and hydrogen in the desired molecular ratio which may vary from 1:1 to 1:4, but is usually about 1:2, is obtained from a source not shown and passes through a pipe 1 through which it is introduced into a synthesis reactor 2. The synthesis gas which is obtained through the pipe 1 is known as fresh feed.

This fresh feed may be obtained from various sources. The controlled oxidation of methane with oxygen and the reaction of steam with coke illustrate two methods of obtaining carbon monoxide and hydrogen.

The reactor 2 is adapted to the catalytic conversion of carbon monoxide and hydrogen into hydrocarbons, oxygenated hydrocarbons and the like.

The reactor 2 is adapted to a fluidized catalyst type of conversion. In this type of conversion, the catalyst is maintained in a state of dense phase fluidization by correlating the particle size and density of the catalyst with the density and velocity at which the reactants pass through the conversion zone. An example of a catalyst that may be employed in this type of conversion for the hydrogenation of carbon monoxide is iron powder of about 100 to 400 mesh containing 1 to 2% potassium oxide and 2 to 3% alumina as promoters. Other promoters such as thoria and magnesia may also be employed. It is also feasible to use supported catalysts.

In the reactor 2, the synthesis gas is converted into hydrocarbon products which comprise both gaseous and liquid hydrocarbons of paraffin and olefin base. The temperature employed varies with the type of conversion and with the catalyst. Pressures ranging from atmospheric to about 1000 pounds per square inch gauge may be used. There is likewise formed in the catalytic conversion steam and carbon dioxide.

The reaction products, together with any diluent nitrogen which may be present and with unreacted carbon monoxide and hydrogen, leave the reactor 2 through a pipe 4. This effluent, comprising normally gaseous and liquid hydrocarbons, carbon dioxide, hydrogen, carbon monoxide and perhaps some nitrogen, passes along the pipe 4 until it is inrtroduced into a condenser 5.

In the condenser 5, steam and normally liquid hydrocarbons present in the effluent are condensed. After condensation of the liquid components, the total effluent leaves the condenser 5 through a pipe 6 and is introduced into a separator 7.

In the separator 7, the gaseous constituents of the effluent from the reactor 2 are separated from the condensed normally liquid components. The condensed liquid fraction leaves the separator 7 through a pipe 8 and flows into a decanter 9. The water present in the condensed fraction is separated from the liquid hydrocarbons in the decanter 9 and is discharged through a pipe 10. The liquid hydrocarbons from which water has been separated leave the decanter 9 through a pipe 11. Their further treatment will be referred to later.

The gaseous components of the effluent comprising carbon dioxide, carbon monoxide, hydrogen and paraffinic and olefinic hydrocarbons which are mainly $C_2$'s to $C_5$'s, but whose upper component may range from the $C_6$'s to the $C_{10}$'s, depending on efficiency of the condenser 5, leave the gas-liquid separator 7 through a pipe 15 and flow therethrough into a fractionator 16. In the fractionator 16, the gasoline fraction of the hydrocarbons present in the gases is condensed and separated from the gaseous stream. These condensed hydrocarbons are withdrawn from fractionator 16 through a pipe 17 which flows into the pipe 11 through which the previously separated liquid hydrocarbons are flowing.

The combined liquid hydrocarbon fraction which flows along the pipe 11 is subjected to further treatment such as fractionation, isomerization, cracking, reforming, etc.

The gases from which the gasoline hydrocarbons in the range of $C_5$'s to $C_{10}$'s have been removed leave the fractionator 16 through a pipe 20. These gases now comprise carbon dioxide, carbon monoxide, hydrogen and gaseous paraffinic and olefinic hydrocarbons in the range of the $C_2$'s to $C_5$'s. The gaseous stream passes along the pipe 20 and is introduced into a polymerization unit 21.

In the polymerization unit 21, the olefin content of the gaseous stream is polymerized to form liquid hydrocarbons. A suitable catalyst, such as phosphoric acid on silica, is employed to catalyze the polymerization. By proper control of the reaction conditions, it is possible to direct this polymerization mainly towards dimer and trimer formation. The presence of diluents such as carbon dioxide, hydrogen, carbon monoxide and paraffins facilitates the directing of the process towards the formation of dimers and trimers.

The effluent which leaves the polymerization unit 21 through a pipe 25 contains polymerized olefins and the constituents enumerated above as diluents. The effluent passes along the pipe 25 and is introduced into a condenser 26 in which the polymerized olefines are condensed. From the condenser 26 the total effluent flows into a gas-liquid separator 28 through a pipe 27. In the separator 28, the liquid hydrocarbons which have been formed by the polymerization of gaseous olefins are separated from the gaseous components of the effluent and removed through a pipe 29. If necessary, these liquid hydrocarbons may also be subjected to further treatment, such as isomerization, to improve their quality.

The gases leave the separator 28 through a pipe 30. The composition of this gas stream is carbon dioxide, carbon monoxide, hydrogen, nitrogen and normally gaseous paraffinic hydrocarbons. This gaseous stream is split into a major and minor portion.

The major portion is recycled directly to the reactor 2 through a pipe 33. A pump 34 inserted in the line 33 is used to raise the recycle stream to the desired pressure prior to its entry into the pipe 1 which serves as the feed pipe for the reactor 2. This recycle stream, comprising mainly carbon dioxide and normally gaseous paraffin hydrocarbons, along with minor quantities of nitrogen, carbon monoxide and hydrogen, combines with the fresh feed in the line 1 prior to entry into the reactor 2.

The minor stream flows along the pipe 30 and is introduced into a carbon dioxide absorbing tower 36. Therein the carbon dioxide present in the minor stream of gas is absorbed as it flows countercurrent to a solution of an absorbent such as monoethanolamine. The gas from which the carbon dioxide has been stripped leaves the absorbing tower 36 through a pipe 37. This gas comprises gaseous paraffin hydrocarbons, hydrogen, carbon monoxide and some nitrogen. This gas may be used for fuel or it may pass to an absorber, not shown, wherein the hydrocarbons are absorbed in an absorbent such as gas oil or charcoal. After desorption the butane portion of the gaseous hydrocarbons may be used in an alkylation process.

The solution of absorbent saturated with carbon dioxide continuously leaves the absorber 36 through a pipe 38 and is introduced into a stripper 39. In the stripper 39 the absorbent solution is regenerated thereby liberating carbon dioxide. The regenerated absorbent solution leaves the stripper 39 through a pipe 40 through which it is returned to the absorber 36 for further use as an absorbing medium.

The liberated carbon dioxide leaves the stripper 39 through a pipe 42. There is inserted in the pipe 42 a vent 43 through which any carbon dioxide which is not to be returned to the reactor 2 may be discharged. There is also inserted in the pipe 42 a pump 44 in which the carbon dioxide is raised to the desired pressure prior to its return to the reactor 2. By recycling carbon dioxide in this fashion, it is possible to maintain the desired concentration of carbon dioxide in the reactor feed.

Thus, the total recycle is made up of two components: the major recycle stream comprises carbon dioxide, normally gaseous paraffin hydrocarbons, nitrogen and unreacted carbon monoxide and hydrogen; the minor stream comprises almost pure carbon dioxide. The total reactor feed contains recycle and fresh feed in the ratio of about 1 to 4 parts of recycle to one part of fresh feed. By adjusting the quantities of the two recycle streams, the total per cent of carbon dioxide in the reactor feed is maintained within the limits of about 15 to 30% depending upon the type of operation, the temperature and the catalyst that is employed in the reactor 2.

The method of recycle as disclosed in this invention is applicable to any type of catalytic conversion of carbon monoxide and hydrogen into hydrocarbons, oxygenated hydrocarbons and the like. The invention may also be used with a fixed bed type of operation. Moreover, the disclosed method of recycle works effectively with all the different catalysts.

Obviously many modifications and variations of the invention, as hereinbefore set forth, may be made without departing from the spirit and scope thereof and, therefore, only such limitations should be imposed as are indicated in the appended claims.

I claim:

1. In the catalytic conversion of carbon monoxide and hydrogen into hydrocarbons, oxygenated hydrocarbons and the like, the method which comprises contacting a mixture of carbon monoxide and hydrogen with a catalyst in a reaction zone, effecting catalytic conversion of said carbon monoxide and hydrogen into hydrocarbons, oxygenated hydrocarbons and the like under suitable conditions of temperature and pressure, obtaining an effluent from said reaction zone comprising normally gaseous and liquid hydrocarbons, steam, carbon dioxide and unreacted carbon monoxide and hydrogen, separating normally gaseous components of said effluent from the normally liquid hydrocarbons and water, polymerizing olefins present in said separated gases by contact with a suitable catalyst, thereby forming liquid hydrocarbons, separating the residual gases from said liquid hydrocarbons, dividing said residual gases, comprising normally gaseous hydrocarbons, carbon monoxide, hydrogen and carbon dioxide into a minor portion and a major portion, recycling said major portion directly to said reaction zone, separating carbon dioxide from the minor portion and recycling said carbon dioxide to reaction zone.

2. The method according to claim 1 in which the normally gaseous hydrocarbons in the major recycle stream are mainly paraffinic in nature.

3. In the catalytic conversion of carbon monoxide and hydrogen into hydrocarbons, oxygenated hydrocarbons and the like, the method which comprises contacting a mixture of carbon monoxide and hydrogen with a catalyst in a reaction zone, effecting catalytic conversion of said carbon monoxide and hydrogen into hydrocarbons, oxygenated hydrocarbons and the like under suitable conditions of temperature and pressure obtaining an effluent from said reaction zone comprising normally gaseous and liquid hydrocarbons, steam, carbon dioxide and unreacted carbon monoxide and hydrogen, separating the normally gaseous components of said effluent from the normally liquid hydrocarbons and water, polymerizing olefins present in said gases by contact with a suitable catalyst, thereby forming liquid hydrocarbons, separating residual gases from said formed liquids, dividing said residual gases comprising normally gaseous hydrocarbons, carbon monoxide, hydrogen and carbon dioxide into a minor portion and a major portion, recycling said major portion directly to said reaction zone, separating carbon dioxide from said minor portion recycling said carbon dioxide to reaction zone and maintaining in the reactor feed about 1 to 4 volumes of recycled material, comprising said carbon dioxide and said major portion, per volume of fresh feed.

4. In the catalytic conversion of carbon monoxide and hydrogen into hydrocarbons, oxygenated hydrocarbons and the like, the method which comprises contacting a mixture of carbon monoxide and hydrogen with a catalyst in a reaction zone, effecting catalytic conversion of said carbon monoxide and hydrogen into hydrocarbons, oxygenated hydrocarbons and the like under suitable conditions of temperature and pressure, obtaining an effluent from said reaction zone comprising normally gaseous and liquid hydrocarbons, steam, carbon dioxide, unreacted carbon monoxide and hydrogen, separating the normally gaseous components of said effluent from the normally liquid hydrocarbons and water, polymerizing olefins present in said gases by contact with a suitable catalyst, thereby forming liquid hydrocarbons, separating the residual gases from said formed liquid hydrocarbons, dividing said residual gases comprising normally gaseous hydrocarbons, carbon monoxide, hydrogen and carbon dioxide into a minor portion and a major portion, recycling said major portion directly to said reaction zone, separating carbon dioxide from said minor portion, recycling said carbon dioxide to said reaction zone, maintaining in the reactor feed about 1 to 4 volumes of recycled material, comprising said carbon dioxide and said major portion, per volume of fresh feed and regulating the quantities of said recycle streams so that the carbon dioxide content of the total reactor feed is maintained within the range of about 15 to 30%.

5. In the process for the catalytic synthesis of hydrocarbons, oxygenated hydrocarbons and the like wherein a synthesis gas comprising hydrogen and carbon monoxide is contacted under reaction conditions with a synthesis catalyst actively effective to effect the reduction of carbon monoxide by hydrogen with the formation of said products, the improvement which comprises maintaining said contact until a substantial degree of conversion has taken place, withdrawing from contact with catalyst the gasiform stream of reaction products, containing normally liquid hydrocarbons, steam, carbon dioxide and minor proportions of carbon monoxide and hydrogen, separating said stream into a fraction essentially normally liquid constituents and a fraction essentially normally gaseous constituents, subjecting the separated normally gaseous fraction to a catalytic treatment step effective to polymerize contained olefins with the production of selective polymers composed of normally liquid hydrocarbons, withdrawing the unpolymerized residual gases from said polymerization step, dividing said residual gases into a major stream and a minor stream, recycling the major stream directly to said reaction zone, subjecting said minor stream to a treatment step effective to recover substantially pure carbon dioxide therefrom and recycling said recovered carbon dioxide to the reaction zone.

LEON P. GAUCHER.

REFERENCES CITED

The following references are of record in the file of this patent:

UNITED STATES PATENTS

| Number | Name | Date |
| --- | --- | --- |
| 2,224,048 | Herbert | Dec. 3, 1940 |
| 2,248,099 | Linckh | July 8, 1941 |
| 2,253,607 | Boyd | Aug. 26, 1941 |
| 2,257,293 | Dreyfus | Sept. 30, 1941 |
| 2,279,052 | Michael | Apr. 7, 1942 |